April 23, 1963  H. H. THOMPSON  3,086,790
LAWN MOWER AXLE MOUNTING
Filed Jan. 9, 1961  2 Sheets-Sheet 1
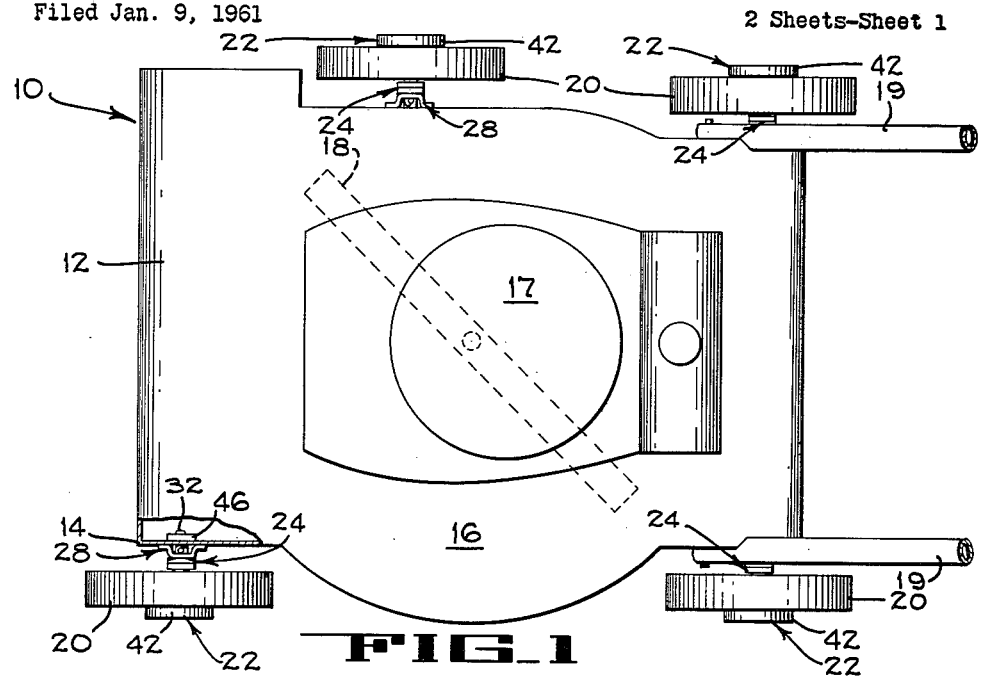
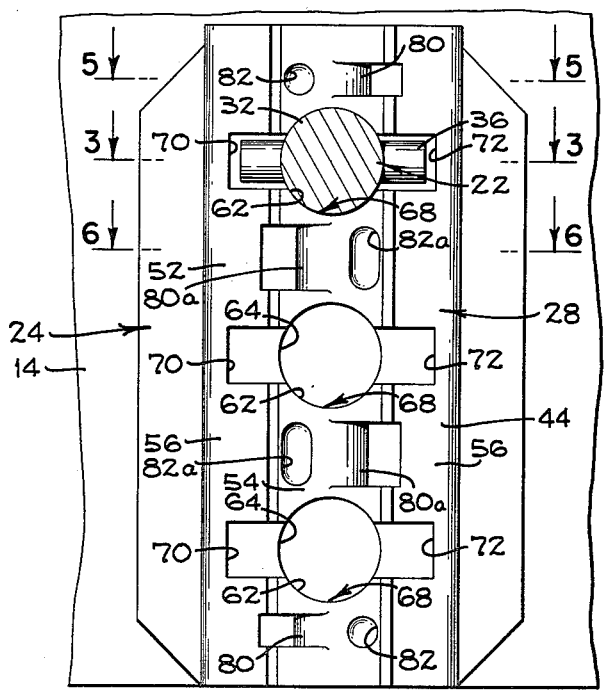
INVENTOR
HOWARD H. THOMPSON
BY
ATTORNEY

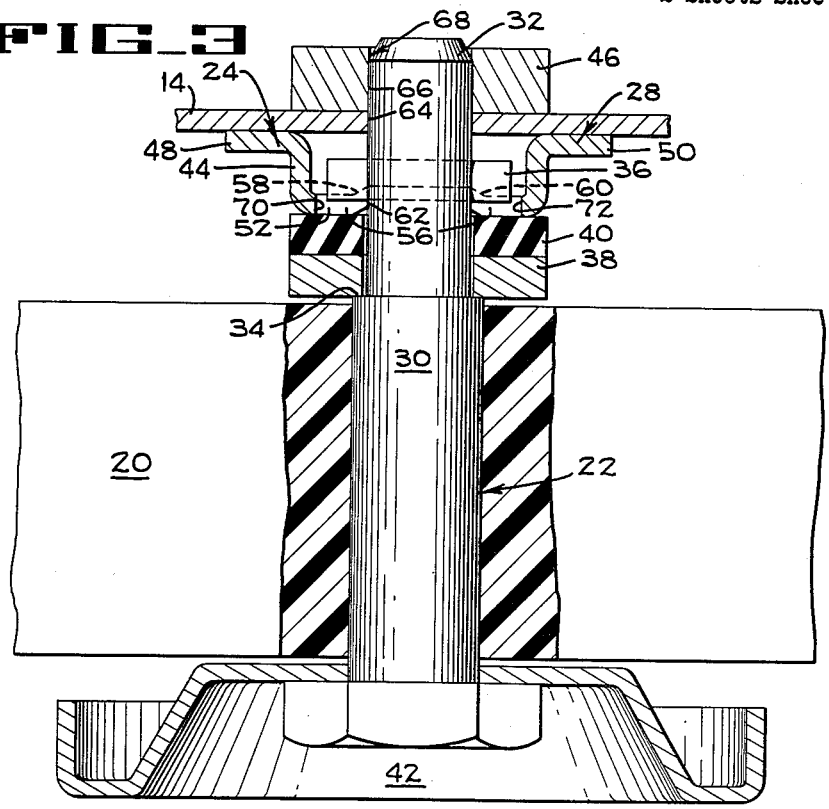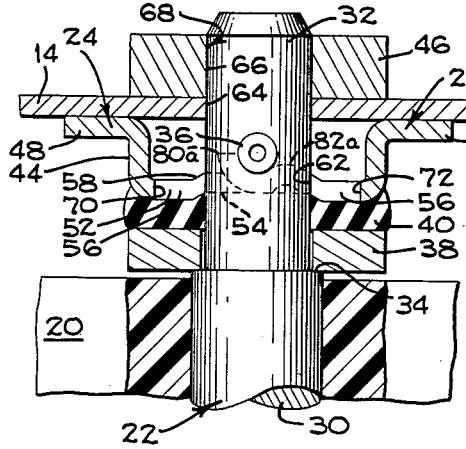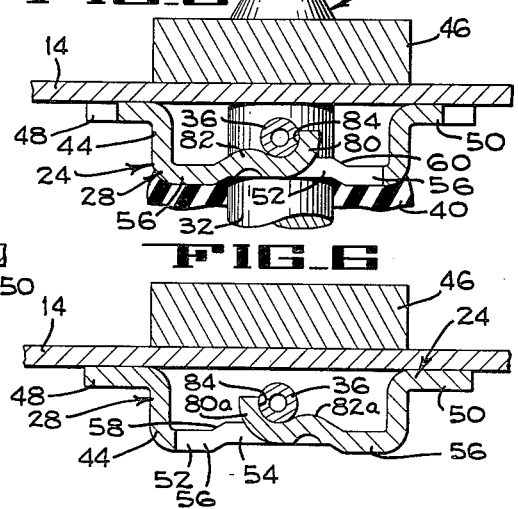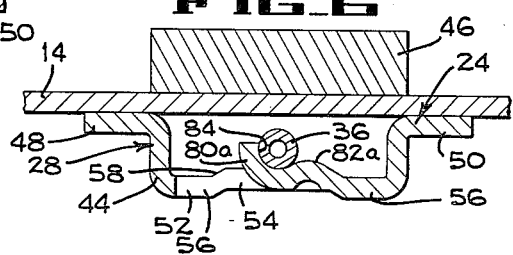

United States Patent Office 3,086,790
Patented Apr. 23, 1963

3,086,790
LAWN MOWER AXLE MOUNTING
Howard H. Thompson, San Jose, Calif., assignor to FMC Corporation, a corporation of Delaware
Filed Jan. 9, 1961, Ser. No. 81,534
6 Claims. (Cl. 280—43)

This invention relates to means for adjusting the height at which a lawn mower will cut, and more particularly to an adjustable wheel and axle mounting for rotary mowers.

An object of the present invention is to provide an improved rotary lawn mower.

Another object is to provide a quickly attachable and detachable coupling for securing the wheel mounting shafts or axles to the body of the mower in selected vertical positions.

A further object is to prevent accidental dislodgement of a quickly attachable and detachable mower wheel and axle assembly.

Still another object is to render the quickly attachable mounting vibration proof, so that the wheel and axle assemblies will remain in place despite vibration caused by motor and blade unbalance.

Another object is the protection of the wheel and axle assemblies from accidental dislodgement by stones or the like that might be hurled against the mounting by the mower blade.

Another object is to provide axle mounting apparatus of the type described which is of simple and economical construction.

Briefly, the quickly attachable and detachable wheel mounting of the present invention is operated in the following manner. A wheel axle is inserted in a selected one of a set of several vertically spaced bores formed in body parts of the mower. The axle is thereupon given a quarter turn to lock it on the body. This simple and rapidly performed operation provides a foolproof, dependable and vibration proof mounting for the wheel, and the wheel can be just as easily dismounted by a mere reversal of the mounting procedure.

These and other objects and advantages of the present invention will become apparent from the following description and the accompanying drawings in which:

FIG. 1 is a top plan of a rotary lawn mower of the present invention with the handle broken away.

FIG. 2 is a fragmentary side elevation of the mower body showing the axle mounting apparatus of the present invention, the outer portion of the axle having been broken away.

FIG. 3 is a horizontal section taken along lines 3—3 of FIG. 2, the axle being shown in full view. The axle is partially mounted in FIG. 3.

FIG. 4 is a fragmentary horizontal section taken on the same lines as the section of FIG. 3 but with the axle rotated into locked position.

FIG. 5 is a fragmentary horizontal section taken along lines 5—5 of FIG. 2 showing one set of detent and stop elements with the axle in the locked position.

FIG. 6 is a fragmentary horizontal section taken along lines 6—6 of FIG. 2 showing a companion set of detent and stop elements and the axle retaining pin, with the axle (not seen) in the locked position.

Referring to FIG. 1, the lawn mower 10 comprises a body 12 having a peripheral skirt 14 depending from a generally horizontal base or deck 16. An engine 17, of any well known type, is mounted on the deck 16 with the vertical drive shaft projecting downward through the deck. A horizontal cutting blade 18 is fixed to the lower end portion of the shaft below the deck 16. A handle 19, broken away in FIGURE 1 is mounted on the body 12.

The body 12 is supported on four transport wheels 20, each of which is rotatable on a stub axle assembly 22 (FIG. 3). The axle assembly 22 forms part of a quick release coupling indicated generally at 24, there being one coupling 24 associated with each wheel.

Each coupling 24 provides means for mounting the associated transport wheel 20 at any one of a plurality of vertically spaced positions on the body 12. Since the couplings 24 employed on all four wheels are the same, only one coupling will be described in detail. The coupling 24, as shown in FIGS. 2–6, comprises two main parts, the axle assembly 22 and a receiver 28.

The axle assembly 22 includes a stub shaft 30 (FIG. 3) upon which the wheel 20 is freely rotatable, and a cylindrical portion or stud 32 of reduced diameter projecting axially from one end of the stub shaft 30. An annular shoulder 34 is provided between the stub shaft 30 and the stud 32. A cylindrical pin 36, fixed adjacent the inner end of the stud 32, extends diametrically of the stud and projects equal distances from opposite sides thereof.

A rigid washer 38 (FIGS. 3 and 4), of relatively large diameter, is freely movable on the stud 32 for bearing engagement with the shoulder 34. Disposed between rigid washer 38 and the pin 36 is a resilient washer 40 formed of elastic material such as rubber. The resilient washer 40 is of the same diameter as the rigid washer 38, and is also freely movable on the stud 32. In order to provide for manipulation of the axle, a hand grip 42 (FIGS. 1 and 3) is fixed to the outer end of the stub shaft 30.

Each receiver 28 comprises an elongate vertically disposed channel-shaped locking plate 44 (FIGS. 2–6) and a relatively thick vertically disposed backing plate 46 (FIGS. 3–6) of similar length. The backing plate 46 is welded to the inner side of the skirt, and opposite side flanges 48 and 50 of the locking plate 44 are welded to the outer side of the skirt 14. Locking plate 44 is formed with a web 52 that is outwardly spaced from the skirt 14 and is in registry with the backing plate 46. The web 52 is formed with a shallow longitudinal channel bounded by marginal portions 56. This channel provides a generally flat pin retaining midportion 54 the inner side of which is inwardly offset from the marginal portions 56 of the web 52. Oppositely inclined camming portions 58 and 60 connect the pin retaining portion 54 to the adjacent marginal portions 56 of the web 52 and cooperate with the pin 36 in a manner later to be described.

In order to receive the axle stud, three vertically spaced sets of axially aligned holes 62, 64 and 66 are formed in the pin retaining portion 54, the skirt 14, and the backing plate 46, respectively (FIGS. 1 and 3). Each set of aligned holes 62, 64 and 66 cooperate to form a bore indicated generally at 68. The bores 68 are of such diameter as to freely receive the stud 32 in any one of three vertically spaced locations.

In order to clear the pin, web 52 is formed with opposite horizontally aligned notches 70 and 72 (FIG. 2) that extend diametically from each hole 62 in the plate portion.

In order to prevent accidental rotation of the axle with consequent release of the wheel, detent and stop means are provided for each pin. Abutment stops 80 (FIGS. 2 and 5) and 80a (FIGS. 2 and 6) are struck out from pin retaining portion 54 adjacent each bore 60. Stops 80a are of double width to serve adjacent bores. Detents 82 and 82a project from the pin retaining portion 54 toward the skirt 14. Detents 82 are associated with stops 80 and detents 82a are wider detents associated with stops 80a (FIG. 2). The detents are smoothly rounded protrusions of the pin retaining portion 54 and each detent is spaced from its associated abutment stop to provide a seat 84 therebetween (FIGS. 5 and 6) to receive an end portion of the pin 36.

The mounting of a wheel and axle assembly will now be described. The stud 32 is inserted into one of the bores 68 and the axle is turned by means of the hand grip 42 to bring the pin 36 into alignment with notches 70 and 72 (FIG. 2). The pin is pushed through the notches to bring the resilient washer 40 (FIG. 2) firmly against the abutment portions 56 of the web 52 with the rigid washer 38 seating against the shoulder 34. When the axle 22 is so disposed, the pin 36 will not quite clear the inner faces of marginal portions 56 (FIG. 3) but the pin will have passed sufficiently far through the notches so that the axle can be turned. It will be noted in this regard that the pin is round in section, so that it presents a cam surface to the inner faces of marginal portions 56 and the pin retaining portion 54.

Assuming the stud to be inserted in the upper bore 68 (FIG. 2) sufficient clockwise torque is now applied to the axle force opposite end portions of the pin 36 over the inner surfaces of the abutment portions 56 and then into engagement with the camming portions 58 and 60. Continued clockwise turning of the axle forces the ends of the pin 36 over the camming portions 58 and 60 to bring the stud 32 farther into the bore 68, against the resistance offered by the resilient washer 40. This action continues until the pin rides onto the inner face of pin retaining portion 54. As seen in FIG. 4, the resilient washer 40 is now compressed between the abutment portions 56 and the rigid washer 38 which compression reacts on the axle 22 to maintain the pin 36 in firm engagement with the pin retaining portion 54. Completion of a quarter turn of the axle forces the end portions of pin 36 over the associated detents 82, 82a with which the stud 32 will be momentarily forced farther into the bore 68 against the resiliency of the rubber washer 40.

When the axle 22 has been turned to its mounted position shown in FIGS. 4–6, the end portions of the pins 36 are in seats 84 and engage the associated stops 80 and 80a and detents 82 and 82a, and the axle is releasably locked in place. Removal of the axle assemblies 22 is accomplished by rotating each axle in an opposite direction to that for locking the axle assemblies in place and withdrawing the same from the associated receiver 28.

More torque must be applied to the axle to force the pins over the detents than would be accidently applied to the axle during normal use of the lawn mower 10. Also friction between the wheel and the axle is insufficient to unseat the pin, and the axle remains firmly mounted in the selected position.

It will be apparent from the foregoing description that the coupling of the present invention provides quick and easy mounting of the axle assemblies 22 in their selected positions to vary the cutting height of the mower. At the same time, once mounted, the wheel will not become accidentally dislodged in service. Furthermore, the wheel will not vibrate loose because the resilient washer is under compression at all times and resists rotation of the axle in the unlatching direction. The positive stop prevents continued turning of the axle assembly. Also, the pin is in a position wherein it is protected from stones or the like that might be hurled by the mower blade.

While a particular embodiment of the present invention has been shown and described, it will be understood that the coupling arrangement 24 is capable of modification and variation without departing from the principles of the invention and that the scope of the invention should be limited only by the scope and proper interpretation of the claims appended hereto.

The invention having thus been described what is believed to be new and desired to be protected by Letters Patent is:

1. In a lawnmower assembly, a body having a depending skirt, a plurality of wheel and axle assemblies, and a receiver for releasably mounting each axle on the skirt; said receiver comprising a plate mounted on said skirt and providing means in conjunction therewith for rigidly mounting an axle on the body, said plate having a pin retaining portion, said pin retaining portion having a bore therethrough and being diametrically notched therethrough at the bore, and a detent adjacent said bore and projecting from the inner side of said pin retaining portion; each wheel axle having a stub shaft portion for rotatably mounting the wheel and a stud projecting from said stub shaft portion for insertion into said bore, a pin projecting diametrically from said stud adjacent the distal end thereof, shoulder means on said axle adjacent the other end of said stud and facing said pin, and resilient means on said stud between said shoulder means and said pin; initial insertion of said stud into said bore causing said pin to be disposed in said notch adjacent the inner side of said pin retaining portion, with said resilient means engaging both said axle mounting means and said shoulder means, and with the side of said pin remote from said shoulder means disposed beyond the inner side of said plate, subsequent partial rotation of said axle in one direction camming said pin onto the inner side of said pin retaining portion while compressing said resilient means, continued rotation of said axle camming said pin over said detent while further compressing said resilient means, said detent releasably retaining said axle against counter rotation for preventing accidental withdrawal of the axle.

2. In a lawnmower assembly, a body having a depending skirt, a plurality of wheel and axle assemblies, and a receiver for releasably mounting each wheel axle on the skirt; said receiver comprising a plate mounted on said skirt and providing means in conjunction therewith for rigidly mounting an axle on the body, said plate having a pin retaining portion, said pin retaining portion having a bore therethrough and being notched therethrough at the bore, a detent adjacent said bore and projecting from the inner side of said pin retaining portion, and an abutment stop projecting from the inner side of said pin retaining portion and spaced from said detent a distance providing a pin-receiving seat between said detent and said abutment stop; each wheel axle having a stub shaft portion for rotatably mounting the wheel and a stud projecting from said stub shaft portion for insertion in said bore, a pin projecting laterally from said stud adjacent the distal end thereof, shoulder means on said axle adjacent the other end of said stud and facing said pin, and resilient means on said stud between said shoulder means and said pin; a backing plate on the opposite side of said skirt from said receiver and having a bore in alignment with the bore in said receiver, the bore in said backing plate being arranged to receive and journal the stud on said axle; initial insertion of said stud into said bore causing said pin to be disposed in said notch adjacent the inner side of said pin retaining portion, with the resilient means engaging both said axle mounting means and said shoulder means, and with the side of said pin remote from said shoulder means disposed beyond the inner side of said pin retaining portion, subsequent partial rotation of said axle camming said pin onto the inner side of said pin retaining portion while compressing said resilient means, continued rotation of said axle camming said pin over said detent while further compressing said resilient means and bringing said pin into said pin-retaining seat and against said abutment stop, said detent releasably retaining said axle against counter rotation for preventing accidental withdrawal of the axle.

3. In a lawnmower assembly, a body having a depending skirt, a plurality of wheel and axle assemblies, and a receiver for releasably mounting each wheel axle on the skirt; said receiver comprising a plate mounted on said skirt and providing means in conjunction therewith for rigidly mounting an axle on the body, said plate being formed with a pin retaining portion inwardly offset from a marginal portion at one side of said pin retaining portion, a camming portion connecting said pin retaining portion and said marginal portion, said pin retaining portion having a bore therethrough and a notch therethrough, said notch extending diametrically crosswise of said pin retaining portion from said bore into said marginal portion, a detent adjacent said bore and projecting from the inner side of said pin retaining portion, and an abutment stop projecting from the inner side of said pin retaining portion and spaced from said detent to provide a pin receiving seat between said detent and said abutment stop; each wheel axle having a stub shaft portion for rotatably mounting the wheel and a stud projecting from said stub shaft portion for insertion into said bore, a pin projecting diametrically from said stud adjacent the distal end thereof, shoulder means on said axle adjacent the other end of said stud and facing said pin, and resilient means on said stud between said shoulder means and said pin; initial insertion of said stud into said bore causing said pin to be disposed in said notch adjacent the inner side of said marginal portion, with said resilient means engaging both said axle mounting means and said shoulder means, and with the side of said pin remote from said shoulder means disposed beyond the inner side of said marginal portion, subsequent partial rotation of said axle in one direction advancing said pin over said camming portion and onto the inner side of said pin retaining portion while compressing said resilient means, continued rotation of said axle camming said pin over said detent while further compressing said resilient means and moving said pin into said pin receiving seat and against said abutment stop to prevent further rotation of said axle, said detent releasably retaining said axle against counter rotation for preventing accidental withdrawal of the axle.

4. In a lawnmower assembly, a body having a depending skirt, a plurality of wheel and axle assemblies, and means for removably mounting each wheel axle on the skirt; said mounting means comprising a plate mounted on the outside of said skirt, said plate having a pin retaining portion spaced outwardly from said skirt and having an inner side facing the skirt, a backing plate mounted on the inside of said skirt opposite said pin retaining portion, means defining aligned bores through said pin retaining portion, said skirt and said backing plate, said pin retaining porton being notched therethrough at the bore, a detent projecting from the inner side of said pin retaining portion adjacent said bore; each wheel axle having a stub shaft portion for rotatably mounting the wheel and a stud projecting from said stub shaft portion for insertion into said bore, a pin spaced from the distal end of said stud and projecting laterally therefrom, shoulder means on said axle facing said pin, and resilient means on said stud between said shoulder means and said pin; initial insertion of said stud into said bore causing said pin to be disposed in said notch adjacent the inner side of said pin retaining portion with said resilient means engaging both the outer side of said pin retaining portion and said axle shoulder means and a distal end portion of said stud entering the bore in said backing plate, and with the side of said pin adjacent said skirt being disposed beyond the inner side of said pin retainer portion, subsequent partial rotation of said axle in one direction camming said pin onto the inner side of said pin retaining portion while compressing said resilient means, continued rotation of said axle camming said pin over said detent while further compressing said resilient means, said detent releasably retaining said axle against counter rotation for preventing accidental withdrawal of the axle.

5. In a lawnmower assembly, a body having a depending skirt and a plurality of wheel and axle assemblies and means for adjustably mounting each wheel axle on the skirt; said mounting means comprising a plate mounted on the outside said skirt, said plate having a pin retaining portion that is spaced outwardly from the skirt and an inner side that faces the skirt, means defining aligned bores through said pin retaining portion and said skirt, said pin retaining portion being diametrically notched therethrough at the bore, and a detent projecting from the inner side of said pin retaining portion adjacent said bore; each wheel axle having a stub shaft portion for rotatably mounting the wheel and a stud projecting from said stub shaft portion for insertion into said aligned bores, a diametrically projecting pin at the inner end of said stud, shoulder means on said axle facing said pin, and resilient means on said stud between said shoulder means and said pin; initial insertion of said stud into said pin retaining portion causing said pin to be disposed in said notch with said resilient means engaging both the outer side of said pin retaining portion and said axle shoulder means, and with the side of said pin remote from said shoulder means being disposed beyond the inner side of said pin retaining portion, subsequent partial rotation of said axle in one direction camming said pin onto the inner side of said pin retaining portion while compressing said resilient means, continued rotation of said axle camming said pin over said detent while further compressing said resilient means, said detent releasably retaining said axle against rotation in the opposite direction for preventing accidental withdrawal of the axle.

6. In a lawnmower assembly, a body having a depending skirt and a plurality of wheel and axle assemblies and means for adjustably mounting each wheel axle on the skirt; said mounting means comprising an elongate plate vertically mounted on said skirt, said plate being formed with a medial pin retaining portion the inner face of which is inwardly offset from the portions of the plate at each side of said medial pin retaining portion, means defining a plurality of vertically spaced sets of axially aligned bores extending through said pin retaining portion and said skirt, said pin retaining portion being diametrically notched therethrough at each bore, and a detent projecting inwardly from the inner side of said pin retaining portion adjacent each bore; each wheel axle having a stub shaft portion for rotatably mounting the wheel and a stud projecting from said stub shaft portion for insertion into said aligned bores, a pin projecting diametrically from said stud adjacent the distal end thereof, shoulder means on said axle facing said pin, resilient means on said stud between said shoulder means and said pin, initial insertion of said stud into said pin retaining portion causing said pin to enter said notch with said resilient means engaging both the wheel mounting means and said axle shoulder means, and with the side of said pin remote from said shoulder means being disposed beyond the inner face of said pin retaining portion, subsequent partial rotation of said axle in one direction camming said pin onto the inner side of said pin retaining portion while compressing said resilient means, continued rotation of said axle camming said pin over said detent while further compressing said resilient means, said detent releasably retaining said axle against rotation in the opposite direction for preventing accidental withdrawal of the axle.

References Cited in the file of this patent
UNITED STATES PATENTS

| | | |
|---|---|---|
| 240,833 | Martin | May 3, 1881 |
| 2,557,119 | Kjerulff | June 19, 1951 |
| 2,879,074 | Roberton | Mar. 24, 1959 |
| 2,882,063 | Strasel | Apr. 4, 1959 |